United States Patent [19]

Raj

[11] Patent Number: 4,526,379
[45] Date of Patent: Jul. 2, 1985

[54] STABILIZED FERROFLUID-FERROFLUID SEAL APPARATUS AND METHOD

[75] Inventor: Kuldip Raj, Merrimack, N.H.

[73] Assignee: Ferrofluidics Corporation, Nashua, N.H.

[21] Appl. No.: 569,190

[22] Filed: Jan. 9, 1984

[51] Int. Cl.³ ............................................. F16J 15/40
[52] U.S. Cl. ....................................... 277/80; 277/135
[58] Field of Search ............... 277/80, 135; 335/302, 335/306

[56] References Cited

U.S. PATENT DOCUMENTS 4,254,961  3/1981  Fersht et al. ........................ 277/80
4,424,974  1/1984  Mitsuya et al. ..................... 277/80

FOREIGN PATENT DOCUMENTS 0023863  2/1979  Japan ................................. 277/80
0030347  3/1979  Japan ................................. 277/80

Primary Examiner—Robert I. Smith
Attorney, Agent, or Firm—Richard P. Crowley

[57] ABSTRACT

A stabilized ferrofluid-ferrofluid interface seal apparatus and method, which method comprises forming a ferrofluid-ferrofluid seal interface between a magnetized ferrofluid O-ring seal and unmagnetized ferrofluid from a ferrofluid reservoir, and maintaining a pressure difference across the ferrofluid-ferrofluid seal interface to stabilize the interface.

19 Claims, 3 Drawing Figures

STABILIZED FERROFLUID-FERROFLUID SEAL APPARATUS AND METHOD

BACKGROUND OF THE INVENTION

In certain applications involving a ferrofluid seal apparatus with one or more ferrofluid sealing rings, a ferrofluid seal may be required, to seal against the same or a different magnetic liquid or ferrofluid, both under static and/or dynamic conditions. One example where it is desirable to provide a ferrofluid seal against a ferrofluid would include gear boxes, where ferrofluid may be used both as a sealant and as a lubricant. Another example includes ferrohydrodynamic spindles such as set forth in U.S. Pat. No. 3,746,407, issued July 17, 1983 and U.S. Pat. No. 3,918,773, issued Nov. 11, 1975, where a ferrofluid may be used both as a bearing and lubricant, and also as a sealant, to retain the ferrofluid or other bearing fluid in the bearing. Typically ferrofluid seals have been employed with single-, dual- or multiple-stage ferrofluid O-ring sealing rings, wherein air or gas exists on both sides of the ferrofluid seal. The employment of a reservoir of ferrofluid, such as a column of ferrofluid or other hydrostatic head of ferrofluid is desirable in order to provide a continuing direct source of supply of ferrofluid to seal in use and, therefore, a stable ferrofluid-ferrofluid interface seal is desirable.

SUMMARY OF THE INVENTION

The invention relates to stabilized ferrofluid-ferrofluid seal apparatus and to a method of stabilizing a ferrofluid-ferrofluid seal interface. In particular, the invention concerns a dual- or multiple-stage ferrofluid seal and bearing apparatus which has a stabilized ferrofluid-ferrofluid-seal interface, and a method of stabilizing such a ferrofluid-ferrofluid interface.

A stabilized ferrofluid-ferrofluid interface seal apparatus has been discovered, which apparatus or system comprises a reservoir of ferrofluid, such as particularly a column of ferrofluid which serves as a supply of ferrofluid to a ferrofluid seal stage. The seal apparatus provides a ferrofluid O-ring seal about a shaft, typically a rotatable shaft element; the ferrofluid seal apparatus having at least one ferrofluid O-ring stage and providing a ferrofluid-ferrofluid interface with ferrofluid from a ferrofluid reservoir. The ferrofluid seal apparatus may include a single-, dual- or multiple-stage ferrofluid seal, and generally in its dual-stage form would comprise an annular permanent magnet, which surrounds a magnetically permeable shaft element, and first and second pole pieces, each pole piece in a magnetic-flux relationship with one or the other end, respectively, of the permanent magnet, with the other ends of the pole pieces extending into a close, noncontacting relationship with the surface of the shaft element, to form one or multiple radial gaps under each of the pole pieces. Where a dual-stage seal is involved, there will be a single radial gap under each end of the pole pieces, and, where a multiple-stage seal is involved, then there would be multiple gaps under one or both of the pole pieces. The multiple-stage seal may be formed by separate edges, for example, knife-like edges at the one end of the pole piece or in the shaft. Ferrofluid is retained and held by the magnetic flux from the permanent magnet in at least two of the radial gaps, to form at least two ferrofluid O-ring seals about the surface of the shaft element, and to define one or more enclosed air or gas cavities on interstage regions on one side of the ferrofluid seal and between the ferrofluid O-ring seals. In a simple embodiment of a dual-stage seal, the enclosed air cavity may be formed between the respective pole pieces, the annular magnet and the surface of the shaft and the ferrofluid in each of the radial gaps, while, with multiple-stage ferrofluid seals, the enclosed air cavities may be between individual radial gaps, as well as where the permanent magnet forms an enclosed air cavity.

In the invention at least one of the ferrofluid O-ring seals, forming the seal about the shaft surface, is in direct liquid contact with the ferrofluid in a reservoir; such as, for example, a column of ferrofluid which ferrofluid forms a direct ferrofluid-ferrofluid interface. The seal interface has ferrofluid retained in an O-ring sealing condition by magnetic flux and ferrofluid generally unaffected by magnetic flux in direct contact with the O-ring ferrofluid. The ferrofluid-ferrofluid interface is maintained in a stable condition by maintaining a pressure difference across the ferrofluid-ferrofluid interface. In one embodiment, a single pressure difference is maintained, while, in other embodiments, a plurality of variable pressures may be maintained on the ferrofluid gas side of the ferrofluid-ferrofluid interface by the use of a multiple-stage ferrofluid seal, through the use of a series of distinct gradient pressures in the multiple interstage regions. A pressure difference is maintained between the hydrostatic pressure of the ferrofluid of the reservoir and the pressure in the enclosed air cavity on the air side of the ferrofluid-ferrofluid interface, such that a greater pressure is maintained on the ferrofluid air side than the total pressure on the ferrofluid-ferrofluid side. Sufficient pressure is maintained in the air cavity on the ferrofluid air side, to maintain the stability of the ferrofluid-ferrofluid interface seal. Such a pressure should be greater than the hydrostatic pressure of the ferrofluid and the pressure in the reservoir, together with a sufficient safety factor, to provide reliability to the seal. The difference in pressure may vary greatly, depending on the particular apparatus involved, and generally includes an additional safety pressure of at least 10% or 20% or more of the pressure on the ferrofluid-ferrofluid side, to provide greater reliability, but the pressure difference should not exceed the burst pressure of the ferrofluid seal.

The invention provides a stabilized ferrofluid seal apparatus particularly useful where the seal operation is used to retain ferrofluid within a hydrodynamic bearing system enclosed by the seal apparatus. The ferrofluid in the bearing cavity about the rotatable shaft may comprise the ferrofluid of the reservoir and acts as ferrolubricant for a thrust or radial or thrust-radial bearing system. The ferrofluid in the reservoir is stabilized by maintaining a pressure differential across the interface. The pressure maintained in the interstage region (dual-stage or multiple-stage seals) or the pressure in the ferrofluid reservoir, or both, can be greater or less than atmospheric pressure. Thus, the interstage region or regions need not be pressurized, but may be partially evacuated so long as a pressure difference is maintained to stabilize the ferrofluid-ferrofluid interface.

In one embodiment where a multiple-stage seal is employed, a varying pressure gradient in the multiple-stage seal regions provides a ferrofluid-ferrofluid seal apparatus of substantial reliability. The ferrofluid seal apparatus may be used as a seal apparatus alone or as a combination ferrofluid seal-bearing assembly with, for example, a single-stage ferrofluid seal, such as described in U.S. Pat. No. 4,407,508, issued Oct. 4, 1983, incorporated by reference herein, the ferrofluid column may be stabilized by the partial evacuation of the reservoir to maintain the desired pressure difference. The pressure within the air-gas cavity or region on the ferrofluid air side of the ferrofluid-ferrofluid interface should be less than the burst pressure required to burst the ferrofluid O-ring seal of that stage.

The invention also comprises a method of maintaining a stable ferrofluid-ferrofluid interface, which method comprises forming a ferrofluid-ferrofluid interface between the same or different ferrofluids, one of the ferrofluids being formed as a ferrofluid seal and held in place through the application of magnetic flux to form an O-ring seal, and the other ferrofluid derived from a reservoir of ferrofluid, and which method comprises stabilizing the ferrofluid-ferrofluid interface by a pressure differential $\Delta P$ where $\Delta P$ is greater than the pressure on the ferrofluid seal by the reservoir ferrofluid.

The ferrofluid seal apparatus of the invention provides for increased reliability of a ferrofluid seal, particularly in a multiple-stage seal, where various interstage regions are pressurized, so that, if one region bursts or becomes unstable, the other regions provide for a reliable sealing system. While the reservoir of ferrofluid provides a continuous supply of ferrofluid to the seal system, it also may be employed as a ferrolubricant or a ferrofluid for a bearing system. The ferrofluid seal apparatus of the invention does not increase the inherent pressure capacity of the ferrofluid seal employed, but greatly increases the reliability and continuous operability of the seal-bearing apparatus.

A wide variety of ferrofluids may be employed as the ferrofluid in the seal apparatus of the invention, which ferrofluids would include ferrolubricants; that is, ferrofluids which also act or function as lubricants, ferrobearing fluids and other liquid magnetic sealing materials, but particularly very low-volatility ferrofluids. Such low-volatility ferrofluids are typically highly refined, natural or synthetic oils having a very narrow boiling-point distribution, in order to avoid low-boiling or more volatile components, and generally comprise synthetic hydrocarbons or long-chain esters. Such ferrofluids also may be employed as ferrolubricants, or may be modified to include lubricants or other additives and materials suitable for the particular purpose for which the ferrofluid is being employed.

The reservoir of ferrofluid used in the ferrofluid seal apparatus system generally comprises a source of a ferrofluid which provides for a hydrostatic head of ferrofluid against the upper ferrofluid O-ring seal of the ferrofluid seal apparatus, and generally would comprise an overhead column of ferrofluid, which exerts a defined pressure capacity based on the density of the ferrofluid and the height of the ferrofluid in the column. In addition to the pressure of the ferrofluid, (which generally is about the density of water), where the ferrofluid is a synthetic hydrocarbon oil or a synthetic ester, there is or may be a pressure within the reservoir of ferrofluid (or the interstage region) itself, which could be an ambient pressure, atmospheric pressure, a pressure greater than atmospheric pressure, or a subatmospheric pressure, such as a vacuum.

In order to maintain a stabilized ferrofluid-ferrofluid liquid seal between the ferrofluid seal apparatus and the ferrofluid reservoir, a pressure, typically air pressure, must be maintained on the opposite side of the ferrofluid O-ring seal greater than the total pressure of the hydrostatic head of ferrofluid in the ferrofluid reservoir and the pressure in the reservoir. For example, and as illustrative only of the requirements to stabilize a ferrofluid-ferrofluid interface, where the height of ferrofluid in a reservoir exerts a hydrostatic pressure of 10 inches of water and an atmospheric pressure is employed within the reservoir equal to 407 inches of water, then the pressure on the ferrofluid air side; that is, within the enclosed air cavity formed by the ferrofluid dual-stage seal apparatus, should be greater than 417 inches, and generally with a safety margin would be 427 inches or greater.

While the invention is disclosed concerning the use of air cavities and the use of air between the interstage regions of the radial gaps of the pole pieces and the magnet, it is, of course, recognized that, rather than employing air, an inert gas or other gaseous materials as desired may be employed, to provide the desired pressure, although typically such pressure will be an air pressure. The air pressure formed within the ferrofluid seal apparatus is usually placed within the interstage regions or the air cavities, prior to contacting the ferrofluid seal with the ferrofluid from the reservoir.

While it might appear that the ferrofluid-ferrofluid seal interface represents a homogeneous system, it has been discovered that it is, in fact, an inhomogeneous system, since, while the ferrofluid used in the ferrofluid reservoir and the ferrofluid employed in the ferrofluid seal, which forms the ferrofluid-ferrofluid interface, may be the same or different, the ferrofluids have different properties. The ferrofluid within the magnetic-flux path of the magnetic field, that is, the O-ring, has different properties than the ferrofluid which is in the reservoir, in that the magnetic field typically provides for a high density ferrofluid, by concentrating the magnetic particles, and also producing a high viscosity and thus a ferrofluid of different properties than the unmagnetized reservoir ferrofluid in contact with the O-ring seal. The pressure capacity of the ferrofluid of the seal generally ranges from about 3 to 5 psi per stage.

The invention will be described for the purpose of illustration only in connection with certain embodiments; however, it is recognized that various changes, additions, modifications and improvements may be made to the illustrated embodiments by those persons skilled in the art, all falling within the spirit and scope of the invention.

DESCRIPTION OF THE EMBODIMENTS

Figure 1:
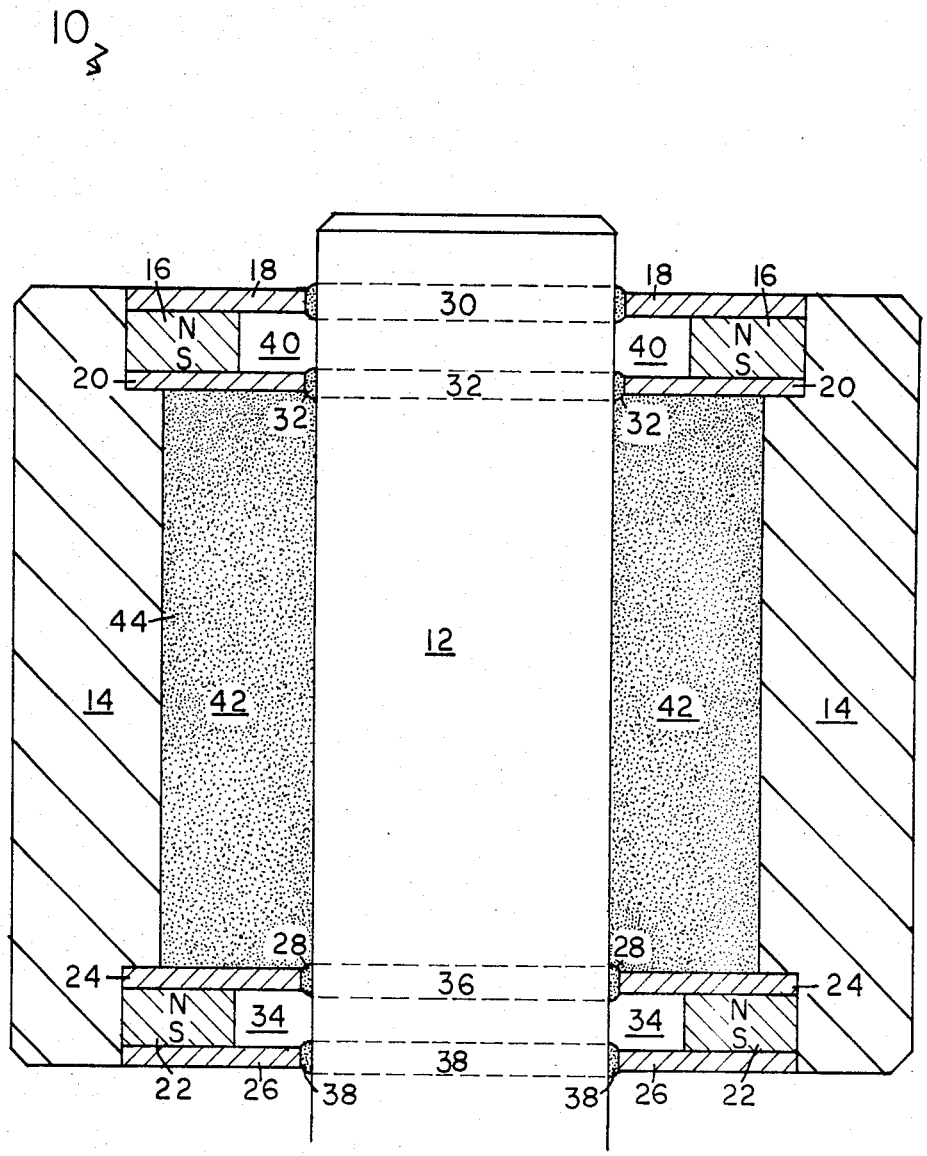
FIG. 1 is a partial sectional view of a simple dual-stage ferrofluid-ferrofluid seal apparatus of the invention.

FIG. 1 is a partial sectional illustrated view of a simple dual-stage ferrofluid exclusion seal system 10 containing a stabilized ferrofluid-ferrofluid interface. The ferrofluid seal 10 is employed to provide a seal about a magnetically permeable rotatable shaft 12 and comprises a nonmagnetic housing 14 with a dual-stage seal at the upper portion of the housing represented by pole pieces 18 and 20 and with an annular permanent magnet 16 to define an air cavity 40 therebetween and with ferrofluid in the radial gaps under each end of the pole pieces 18 and 20 to form ferrofluid O-ring seals 30 and 32. The lower section of the exclusion seal system 10 comprises an annular permanent magnet 22 with pole pieces 24 and 26 to define therebetween an air cavity 34 and with ferrofluid under the radial gaps under the pole pieces 24 and 26 to define two spaced-apart ferrofluid O-ring seals 36 and 38. The ferrofluid O-ring stage seals are shown illustrated by dotted lines across the face of the shaft 12 and by the presence of ferrofluid in the radial gaps under the ends of the pole pieces. Between the radial seals 32 and 38 the pole pieces 20 and 24 and the housing 14 defines a ferrofluid reservoir storage cavity 42 containing a ferrofluid 44 which ferrofluid may be the same or different ferrofluid than that employed in defining the ferrofluid O-ring stage seals, but typically is the same ferrofluid. The O-ring stage seals beneath the radial gaps at the end of the pole pieces 18, 20, 24 and 26, are retained in position due to the magnetic flux from the respective magnets 16 and 22, while the ferrofluid 44 in the reservoir 42 is not acted upon by the magnetic flux from the respective magnets. A ferrofluid-ferrofluid interface is formed as illustrated at 28 between the ferrofluid O-ring 36 under pole piece 24 and the hydrostatic head of the ferrofluid in cavity 42 and typically, ferrofluid O-ring stage seals has an exclusion pressure of 2 to about 6 psi. Generally the ferrofluid forming the ring 36 and the ferrofluid 44 in the cavity 42 is the same and generally comprises a low-volatility hydrocarbon- or ester-type ferrofluid. In order to maintain a stable ferrofluid-ferrofluid interface 28, the pressure within the air cavity 34 on the air ferrofluid side is greater than the total pressure, which is the pressure against the top of the ferrofluid-ferrofluid interface 28 due to the hydrostatic pressure head of the ferrofluid 44 in the cavity 42 on the ferrofluid-ferrofluid interface 28. Thus, in the particular illustration described in FIG. 1 a pressure is maintained, $P_1$ in cavity 34, greater than the pressure, for example, $P_2$, on the ferrofluid 44 in the cavity 42, and the pressure $P_3$, which is the hydrostatic pressure represented by the length of the ferrofluid 44 in the cavity 42. Of course it is recognized that the cavity 42 may not be completely full as illustrated and a partial pressure may be maintained; however, the pressure of $P_1$ in the air cavity 34 should exceed the pressure of $P_2$ and $P_3$ so as to maintain a stable ferrofluid-ferrofluid seal. The pressure in $P_1$ should not be so great as to greatly exceed the burst pressure of the exclusion seal, but generally should include a safety margin. The ferrofluid-ferrofluid exclusion seal apparatus 10 of FIG. 1 thus provides for a reliable dual-stage seal wherein the ferrofluid 44 on the reservoir 42 is fed continuously by gravity into the ferrofluid O-ring seal 36 and across the interface 28 as required when the ferrofluid in the O-ring stage seal 36 requires replenishment.

Figure 2:
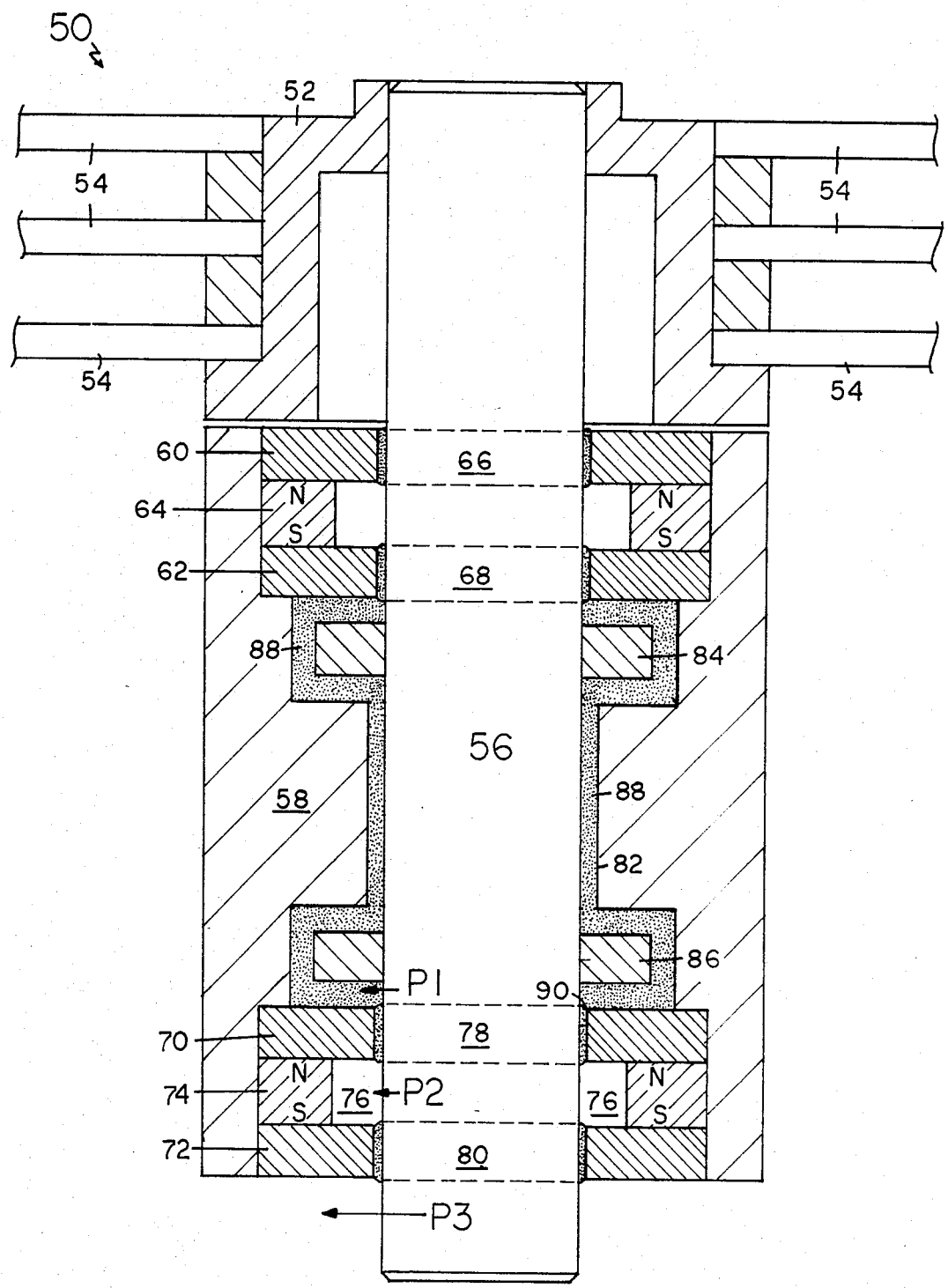
FIG. 2 is a partial sectional view of a dual-stage ferrofluid seal and bearing system having a ferrofluid-ferrofluid interface.

FIG. 2 is a partial, sectional and schematic view of a ferrofluid seal-bearing system employed for a computer disk drive wherein a ferrofluid dual-stage, combined seal apparatus is employed combined with a radial and thrust bearing system and which includes a ferrofluid-ferrofluid interface. The system 50 is designed to contain the ferrolubricant employed for the radial and thrust bearing apparatus within the bearing cavity and also to provide an exclusion seal for the contamination-free environment in which the computer disk drive and the computer disk are operated. The system 50 comprises a computer disk drive head 52 mounted on and secure for rotation with a magnetically permeable shaft 56 and which computer disk drive 52 contains a plurality of computer disks 54 thereon which are to be operated in a contamination-free environment. The ferrofluid seal and bearing apparatus contains a nonmagnetic housing 58 which includes two dual-stage ferrofluid seal apparatus, the upper seal comprising a pole piece 60 and 62 and an intervening annular magnet 64 to provide two ferrofluid O-ring seals 66 which is an exclusion seal which protects the contamination-free atmosphere which the computer disk drive 52 and the computer disk 54 operate and a lower O-ring seal 68 is designed to contain the ferrolubricant in the bearing cavity. The lower ferrofluid seal apparatus comprises an annular permanent magnet 74 and pole pieces 70 and 72 which define therebetween an annular air cavity 76 and which ferrofluid seal has two O-rings, an upper O-ring 78 which forms a ferrofluid-ferrofluid interface 90 and a lower seal 80. Intermediate the two ferrofluid O-ring seals 68 and 78 is disposed within the housing 58 a burring cavity which contains a ferrolubricant 88 which may be the same ferrofluid as employed in the ferrofluid seals or which may be different. The bearing comprises annular upper 84 and a lower 86 thrust bearing disposed in a cavity which contains the ferrolubricant 88 while the housing extends into a close distance surrounding the shaft 56 to form a radial bearing surface 82 which defines a ferrofluid column of ferrolubricant extending between the two upper and lower thrust bearing cavities.

As illustrated, a ferrofluid-ferrofluid interface is also shown at the upper portion of the bearing apparatus with O-ring 68; however, the stabilized ferrofluid-ferrofluid interface is interface 90. Ferrofluid seal 66 prevents contamination from entering the environmental and contamination-free atmosphere in which the computer disk 54 operates, while O-ring stage seals 68 retains the ferrolubricant 88 within the bearing cavities for use in the thrust and radial bearing, while O-ring seal 78 also contains the ferrolubricant 88 within the cavity and may be replenished from the ferrofluid 88 within the bearing cavity, while ferrofluid O-ring seal 80 provides for an intervening air cavity 76.

In order to provide a pressure differential across the ferrofluid-ferrofluid interface 90, the air cavity 76 is pressurized to a pressure $P_2$ which pressure is greater than the pressure $P_1$ representing the hydrostatic head pressure of the ferrofluid 88 and the bearing cavity, yet pressure $P_2$ is not so great as to burst the ferrofluid seals 78 and 80; that is, not greater than about 2-6 psi. Thus, a stabilized ferrofluid-ferrofluid interface is provided in the ferrofluid bearing seal system 50 as illustrated by maintaining a pressure $P_2$ greater than $P_1$, but less than the burst pressure of the ferrofluid seals 78 and 80. Pressure $P_3$ as illustrated is an atmospheric pressure, or may be a vacuum or even a higher pressure, and represents the pressure existing outside of the ferrofluid seal apparatus.

Figure 3:
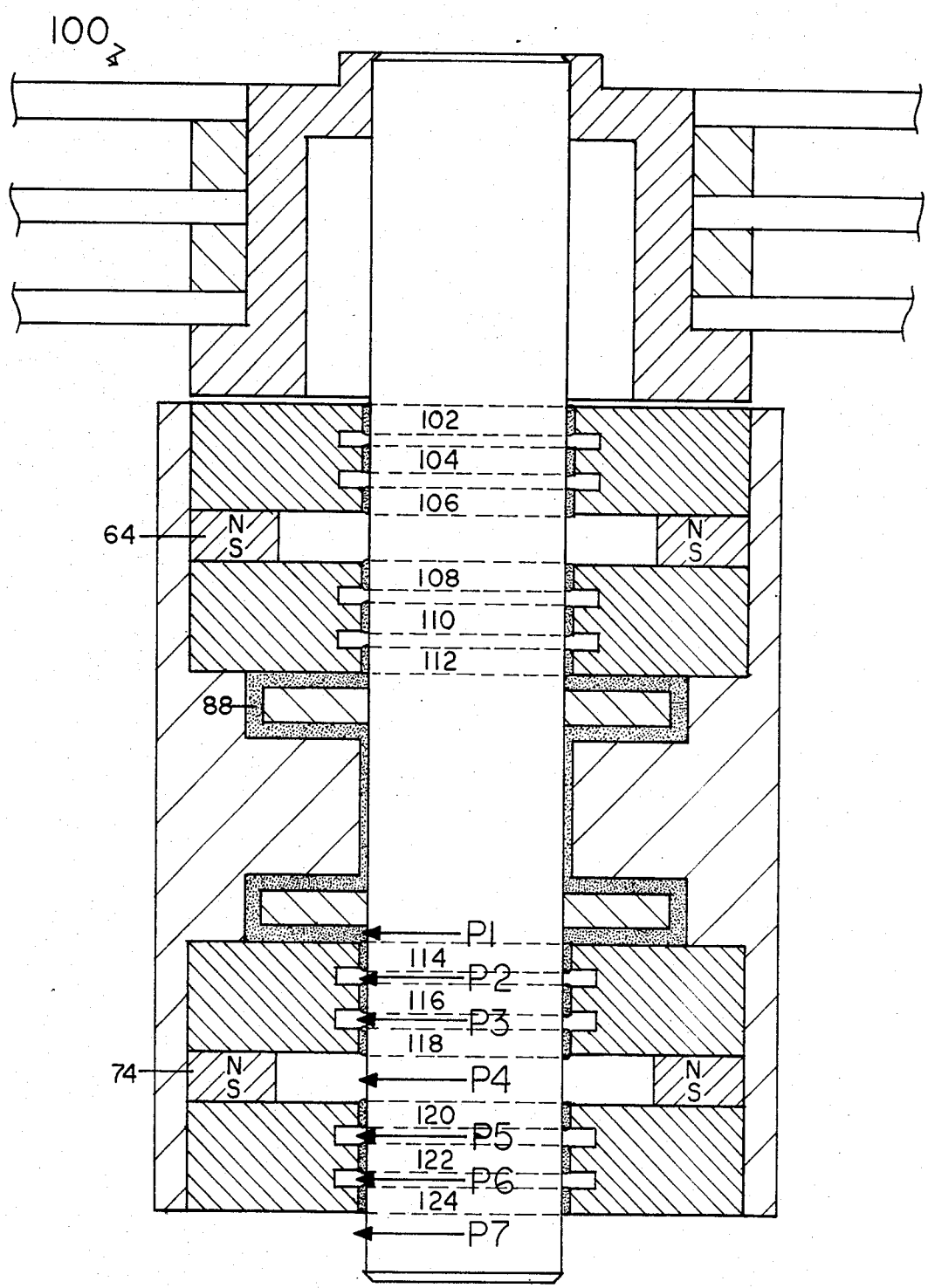
FIG. 3 is a partial sectional view of a pressurized multiple-stage ferrofluid seal and bearing system having a ferrofluid-ferrofluid interface.

FIG. 3 is a partial illustrative schematic view of another multiple-stage ferrofluid seal-bearing system employed with a computer disk drive and similar to the ferrofluid seal and bearing of FIG. 2, except that the pole pieces have knife edges or grooves therein in order to define a plurality of separate ferrofluid O-ring sealing rings beneath each of the groove edges and define a pressure-type multiple-stage ferrofluid seal to enclose the radial and thrust bearing apparatus. The system 100 includes pole pieces to define a plurality of separate ferrofluid O-ring seals 102, 104 and 106, under one upper pole piece 108, 110 and 112, under the other pole piece in the upper ferrofluid seal. Ferrofluid O-ring seal 102 is designed to be an exclusion seal, 104 and 106 are backup seals with higher pressure between the individual gaps between the O-ring seals, while the lower multiple-stage seals 112 are to prevent the upward movement and to retain the ferrolubricant 88 within the bearing cavity, while seals 108 and 110 provide for a higher pressure and pressurizing of the intervening air cavities. Thus, the upper ferrofluid seal has gradient pressures which are or which may be the same pressures in order to provide backup for their respective functions.

The lower ferrofluid seal comprises a plurality of O-ring seals under one pole piece of 114, 116 and 118, with O-ring seal 114 forming a ferrofluid-ferrofluid interface with the ferrofluid 88 in the bearing cavity, and having intervening air cavities therebetween; while the other pole piece of the lower ferrofluid seal defines multiple-stage O-ring seals 120, 122 and 124. As illustrated, the intervening cavities of the lower ferrofluid seal are pressurized at different levels of $P_2$ and $P_3$, with the intervening cavity at $P_4$, and then the interstage seal cavities at $P_5$ and $P_6$, and with the outside of the seal designated as $P_7$ and typically atmospheric. Prior to the assembly of the ferrofluid seal bearing system the interstage pressure on $P_2$ and $P_3$, air cavity $P_4$, and interstage pressures $P_5$ and $P_6$, may be individually pressurized to designated pressure levels. As illustrated in FIG. 1 the ferrofluid-ferrofluid interface on the top of O-ring seal 114 and with the ferrolubricant 88 in the bearing cavity is stabilized by maintaining a pressure $P_2$ which is greater than the pressure $P_1$ which represents the hydrostatic head pressure of the ferrofluid 88 in the bearing cavity, but less than the pressure required to burst the O-ring seal 114, while pressure $P_2$ is slightly greater than $P_1$, but less the burst the pressure of the seal, while $P_3$ is greater than $P_1$. Likewise, $P_4$ is greater than $P_3$, $P_5$ greater than $P_4$, and $P_6$ greater than $P_5$, all to provide a gradient pressure multiple-stage ferrofluid seal-bearing system 100 having a stabilized ferrofluid-ferrofluid interface. Thus, the ferrofluid-ferrofluid interstage seal bearing system as described provides for a continuous source of ferrofluid or ferrolubricant from the lower ferrofluid O-ring sealing stage, and also provides for containment of the ferrolubricant within the bearing cavity.

What is claimed is:

1. A stabilized ferrofluid-ferrofluid interface seal system which comprises:
   (a) a magnetically permeable shaft element;
   (b) a ferrofluid sealing means to provide at least one magnetized ferrofluid O-ring seal about the shaft element, the O-ring seal retained about the shaft element by a magnetic flux field, the ferrofluid O-ring seal having a one side and another side, the sealing means characterized by a gas cavity and one side of the ferrofluid O-ring seal forming a magnetized ferrofluid-gas interface in the gas cavity;
   (c) a ferrofluid reservoir means to contain a source of ferrofluid and to provide a direct source of ferrofluid to the magnetized ferrofluid O-ring seal;
   (d) unmagnetized ferrofluid in the reservoir means which forms an unmagnetized ferrofluid-magnetized ferrofluid interface with the other side of the ferrofluid of the O-ring seal; and
   (e) means to maintain a pressure difference across the ferrofluid-ferrofluid interface to stabilize the ferrofluid-ferrofluid interface, by controlling the pressure in the gas cavity, the pressure in the gas cavity greater than the pressure on the ferrofluid-ferrofluid interface and less than the burst pressure of the ferrofluid O-ring seal.

2. The system of claim 1 wherein the ferrofluid sealing means comprises a dual-stage ferrofluid seal, wherein at least two ferrofluid O-ring seals are formed about the shaft element and are spaced apart from each other, to define therebetween a gas cavity, which gas cavity is maintained in a pressure condition to stabilize the ferrofluid-ferrofluid interface.

3. The system of claim 1 wherein the ferrofluid sealing means comprises a multiple-stage ferrofluid sealing means, having a plurality of ferrofluid O-ring seals spaced apart and about the surface of the shaft element, and defining therebetween two or more enclosed, interstage, gas cavities, the gas cavity adjacent the ferrofluid-gas interface of the ferrofluid-ferrofluid interface having a pressure greater than the total pressure on the ferrofluid-ferrofluid side of said interface.

4. The system of claim 3 wherein the interstage gas cavities have a gradient pressure of defined increasing amounts extending from the gas cavity adjacent the ferrofluid-gas interface, opposite the ferrofluid-ferrofluid interface, and increasing in defined pressure gradients in each gas cavity.

5. The system of claim 1 wherein the ferrofluid in the reservoir and the ferrofluid which forms the ferrofluid O-ring seal comprise a low-volatility, synthetic, hydrocarbon or ester ferrofluid.

6. A stabilized ferrofluid-ferrofluid interface seal system which comprises:
   (a) a rotatable shaft element having one end and another end;
   (b) a ferrofluid seal apparatus which provides at least one magnetized ferrofluid O-ring seal about the shaft element, the ferrofluid seal comprising an annular permanent magnet which surrounds the shaft, and first and second pole pieces, each pole piece in a magnetic-flux relationship with one and the other ends, respectively, of the permanent magnet, with the other end of each of the pole pieces extending into a close, noncontacting relationship with the surface of the shaft element, to form one or more radial gaps under each of the pole pieces;
   (c) ferrofluid retained by the magnetic flux in at least two of the radial gaps so formed, to form at least two ferrofluid O-ring seals about the shaft element and to define one or more enclosed air cavities between the O-ring seals;
   (d) a column reservoir of ferrofluid and ferrofluid in the reservoir, which ferrofluid forms an unmagnetized ferrofluid-ferrofluid interface with the magnetized ferrofluid magnetized of one of the O-ring seals, and which ferrofluid in the reservoir exerts a hydrostatic head pressure on said ferrofluid O-ring seal, one end of the shaft element extending into the ferrofluid of the reservoir; and
   (e) means to stabilize the ferrofluid-ferrofluid interface by maintaining a pressure difference across the ferrofluid-ferrofluid interface, with the pressure in the air cavity on the ferrofluid-air interface greater than the total pressure on the ferrofluid-ferrofluid side of said interface.

7. The system of claim 6 wherein the ferrofluid seal apparatus comprises a multiple-stage ferrofluid seal having a plurality of separate, spaced-apart O-ring seals about the shaft element, to define a plurality of interstage air cavities between the ferrofluid seals, with said air cavities having an air pressure of increasing and defined pressure gradient extending from the air cavity adjacent the ferrofluid air side of the said interface.

8. A stabilized ferrofluid-ferrofluid interface seal system which comprises:

(a) a shaft element to be sealed;

(b) a first upper ferrofluid sealing means about the shaft element to form at least two spaced-apart ferrofluid O-ring seals about the shaft element with a gas cavity therebetween;

(c) a second lower ferrofluid sealing means about the shaft element to form at least two spaced-apart ferrofluid O-ring seals about the shaft element with a gas cavity therebetween;

(d) a housing for the first and second ferrofluid sealing means, which housing defines between the first and second sealing means a reservoir cavity, the shaft element passing through the housing cavity;

(e) ferrofluid in the reservoir cavity of the housing, the magnetized ferrofluid forming an unmagnetized ferrofluid-magnetized ferrofluid interface with the first lower ferrofluid O-ring seal and exerting a pressure on the ferrofluid-ferrofluid interface; and (f) means to maintain a pressure in the lower gas cavity sufficient to overcome the pressure of the ferrofluid of the reservoir and insufficient to burst the first and second O-ring seal of the second ferrofluid sealing means.

9. The system of claim 8 wherein the system includes a radial bearing means surrounding the shaft element in the reservoir cavity and an upper and lower thrust bearing means in the reservoir cavity, the ferrofluid in the reservoir comprising a ferrolubricant.

10. A computer disk drive system which includes a computer disk drive means and the seal system of claim 8 wherein the computer disk drive means is secured to the shaft element for rotation therewith, and the first upper ferrofluid sealing means provides a ferrofluid O-ring seal between the ferrofluid in the reservoir cavity and the computer disk drive means.

11. A computer disk drive system which comprises a computer disk drive secured to the shaft element for rotation therewith, computer disks on the computer disk drive, and the ferrofluid sealing means of claim 1 wherein an O-ring ferrofluid seal is positioned about the shaft element and between the computer disk drive and the ferrofluid reservoir means.

12. A method for stabilizing a ferrofluid-ferrofluid interface in a ferrofluid sealing system, which method comprises:

(a) forming a ferrofluid-ferrofluid interface between unmagnetized ferrofluid in a ferrofluid reservoir and a magnetized ferrofluid in a ferrofluid O-ring seal maintained in a sealing relationship with a shaft by magnetic flux, and forming a gas cavity on the opposite side of the ferrofluid-ferrofluid interface to define a gas-ferrofluid interface; and (b) stabilizing the ferrofluid-ferrofluid interface by controlling the pressure on the gas-ferrofluid side of the ferrofluid-ferrofluid interface to provide a pressure difference across the ferrofluid-ferrofluid interface, the pressure in the gas cavity greater than the total pressure on the ferrofluid-ferrofluid interface and less than the burst pressure of the ferrofluid O-ring seal.

13. The method of claim 12 which includes forming a plurality of spaced-apart O-ring seals about the surface of a rotatable shaft element, the O-ring seals held in position by magnetic flux and defining therebetween a plurality of separate air cavities, one of said seals defining a ferrofluid-ferrofluid interface with the ferrofluid of the reservoir, and the air cavities being maintained under an increasingly greater pressure gradient along the surface of the shaft, thereby providing a ferrofluid-ferrofluid seal system and method of high reliability.

14. The method of claim 12 wherein the pressure in the cavity adjacent the ferrofluid-ferrofluid interface is greater up to 20% than the total pressure on the ferrofluid-ferrofluid interface.

15. The method of claim 12 which includes forming upper and lower ferrofluid O-ring seals about a shaft element passing through a housing, the housing containing a column reservoir of ferrofluid, the upper and lower ferrofluid seals containing the ferrofluid in the reservoir, and the lower ferrofluid O-ring seal forming said ferrofluid-ferrofluid interface with the ferrofluid of the reservoir.

16. The method of claim 12 which includes the ferrofluid of the O-ring seal and the ferrofluid in the reservoir comprising a low-volatility hydrocarbon- or ester-based ferrolubricant.

17. The method of claim 12 which includes forming radial bearing surfaces and thrust bearing surfaces about the shaft in the ferrofluid reservoir and forming ferrofluid O-ring seals at each end of the reservoir to contain the ferrofluid within the reservoir.

18. The method of claim 12 wherein the pressure in the ferrofluid reservoir is less than atmospheric pressure, and the pressure in the gas cavity is maintained at a pressure which exceeds the total of the subatmospheric pressure in the ferrofluid reservoir and the hydrostatic head pressure of the ferrofluid in the ferrofluid reservoir.

19. The method of claim 12 wherein the pressure in the gas cavity to stabilize the ferrofluid-ferrofluid interface is less than atmospheric pressure.

* * * * *